United States Patent
Hotta et al.

(10) Patent No.: US 8,758,877 B2
(45) Date of Patent: Jun. 24, 2014

(54) ANTIGLARE HARD COAT FILM

(75) Inventors: Takeshi Hotta, Higashimatsuyama (JP); Takeo Suzuki, Higashimatsuyama (JP); Toshihide Fukuyama, Higashimatsuyama (JP); Yusuke Sugiyama, Higashimatsuyama (JP)

(73) Assignee: Nippon Paper Chemicals Co., Ltd., Tokyo (JP)

( * ) Notice: Subject to any disclaimer, the term of this patent is extended or adjusted under 35 U.S.C. 154(b) by 0 days.

(21) Appl. No.: 13/262,115

(22) PCT Filed: Mar. 28, 2010

(86) PCT No.: PCT/JP2010/055475
§ 371 (c)(1),
(2), (4) Date: Feb. 14, 2012

(87) PCT Pub. No.: WO2010/113827
PCT Pub. Date: Oct. 7, 2010

(65) Prior Publication Data
US 2012/0141736 A1    Jun. 7, 2012

(30) Foreign Application Priority Data

Mar. 30, 2009  (JP) ................. 2009-081796
Nov. 27, 2009  (JP) ................. 2009-270381

(51) Int. Cl.
*B32B 3/00*  (2006.01)

(52) U.S. Cl.
USPC ........................... 428/143; 428/141

(58) Field of Classification Search
CPC ...... C09D 7/1283; C09D 7/125; C09D 7/001; C09D 7/1291; C09D 161/30; C08J 7/04
USPC .................................. 428/141, 143
See application file for complete search history.

(56) References Cited

U.S. PATENT DOCUMENTS

| | | | |
|---|---|---|---|
| 7,939,160 B2 * | 5/2011 | Furuya et al. ............. | 428/141 |
| 8,163,372 B2 * | 4/2012 | Furui et al. .............. | 428/141 |
| 2004/0071937 A1 * | 4/2004 | Chien et al. .............. | 428/143 |
| 2006/0099385 A1 * | 5/2006 | Onozawa et al. ........... | 428/141 |
| 2006/0159902 A1 * | 7/2006 | Suzuki .................. | 428/212 |
| 2007/0139783 A1 * | 6/2007 | Furuya et al. ............. | 359/606 |
| 2007/0253066 A1 | 11/2007 | Takao et al. | |
| 2008/0212190 A1 * | 9/2008 | Kameshima et al. ......... | 359/614 |
| 2008/0305301 A1 * | 12/2008 | Hsu et al. ............... | 428/147 |
| 2012/0002282 A1 * | 1/2012 | Nagahama et al. ......... | 359/488.01 |

FOREIGN PATENT DOCUMENTS

| | | | | |
|---|---|---|---|---|
| JP | 2007-316576 A | 12/2007 | | |
| JP | 2007-322779 A | 12/2007 | | |
| JP | 2008-304638 A | 12/2008 | | |
| JP | 2009-037046 A | 2/2009 | | |
| WO | 2006/106757 A1 | 10/2006 | | |
| WO | WO 2009151068 A1 * | 12/2009 | ............ | G02B 5/02 |

\* cited by examiner

*Primary Examiner* — Maria Veronica Ewald
*Assistant Examiner* — Nathan Van Sell
(74) *Attorney, Agent, or Firm* — Sughrue Mion, PLLC

(57) ABSTRACT

An antiglare hard coat film is provided in which light transmittance is high without giving antiglare properties more than necessary, a haze value is low, transparency is excellent, image clarity is high, glare of an image is suppressed, whitishness (white blur) of the film is reduced, contrast deterioration is suppressed, and visibility of the display is improved as compared with prior-art antiglare films.

This antiglare hard coat film is formed by providing an antiglare hard coat layer containing organic particulates and a resin on a transparent film. When an average value of height in an evaluation region on the surface of the antiglare hard coat film is set to zero (0), a maximum sectional height represented by a difference between a height maximum value in the evaluation region and a height minimum value in the evaluation region is 0.6 μm or less.

12 Claims, No Drawings

ANTIGLARE HARD COAT FILM

CROSS REFERENCE TO RELATED APPLICATIONS

This application is a National Stage of International Application No. PCT/JP2010/055475 filed Mar. 28, 2010, claiming priority based on Japanese Patent Application Nos. 2009-081796 filed Mar. 30, 2009 and 2009-270381 filed Nov. 27, 2009, the contents of all of which are incorporated herein by reference in their entirety.

TECHNICAL FIELD

The present invention relates to an antiglare hard coat film suitable for preventing deterioration of visibility used on the surface of various displays represented by a liquid crystal display, a plasma display, and an organic EL display.

BACKGROUND ART

In displays of laptop computers, liquid-crystal monitors and the like, antiglare properties are realized usually by applying a mixture of organic or inorganic particulates and a binder resin or a curable resin on a base material and forming irregularity on the surface in order to prevent reflection of the outside scenery on the display surface. In order to improve the antiglare properties, the shape of the irregularity needs to be enlarged or the frequency of the irregularity needs to be increased. However, if the irregularity is large or the frequency thereof is increased, the haze value (haze degree) of the antiglare layer is raised, and though the antiglare properties are obtained, there are problems of white blur on the screen caused by reflection of external light and lowered image clarity caused by the rise in the haze value, which deteriorates visibility of a display image. Moreover, if the haze value on the surface, which is a general evaluation of the prior-art antiglare hard coat film, is lowered, though the degree of white blur of the screen caused by reflection of the external light can be suppressed, glaring brightness referred to as so-called scintillation (glare) becomes strong on the film surface. In order to solve this, a method of raising the haze value inside the antiglare layer has been used, but light transmittance is lowered by internal haze caused by a refractive index difference between the particulates and the resin, which lowers display brightness of the display device, and since a coated film becomes whitish due to the internal haze at the same time, contrast deterioration is extreme.

For example, Japanese Unexamined Patent Application Publication No. 11-326608 (Patent Document 1) discloses an antiglare film in which translucent particulates having an average grain size of 0.5 to 5 μm and a difference in refractive index from the light transmissive resin is 0.02 to 0.2 are mixed. Patent Document 1 describes that by setting the difference in refractive index between the translucent resin which forms the antiglare layer and the translucent particulates contained therein to 0.02 to 0.2, image clarity can be improved without lowering diffusion/antiglare properties and in this case, even if the haze value is raised so as to reduce glaring, the image clarity can be maintained high. However, antiglare properties are ensured with the specifically obtained haze of the film as high as 10% or more, while the coated film becomes whitish, and deterioration in the light transmittance and contrast are extreme.

Also, with Japanese Unexamined Patent Application Publication No. 2008-286878 (Patent Document 2), since the refractive index difference between a hardened substance in a binder and translucent particulates is kept to a small range of 0 to 0.05 in the antiglare film, light transmittance inside the antiglare hard coat layer can be improved, and since arithmetic average roughness (Ra) measured in compliance with JIS B 0601-1994 is 0.01 to 0.30 μm and an average interval (Sm) of irregularity is kept to a small range of 10 to 300 μm on the surface of the antiglare hard coat layer, light diffusion on the surface (outer face) of the antiglare hard coat layer is exerted, while light transmittance can be maintained, and with the antiglare film, suppression of glaring and improvement of transmissive clarity can be exerted in a well-balanced manner. However, the ranges of the arithmetic average roughness (Ra) at 0.01 to 0.30 μm and the average interval (Sm) of irregularity at 10 to 300 μm are not small, and most of the antiglare films merchandized in the market at present fall into this range. Also, with the specifically obtained film having the arithmetic average roughness (Ra) at 0.1 μm or more, a value of image clarity measured through an optical comb having a width at 2 mm at less than 70%, and the value of the image clarity measured by reflection at 60% or less, the antiglare properties are ensured, but there remains problems that prevention of glare on a high-definition panel is insufficient, whitishness of the coated film is not considered and deterioration in the light transmittance and contrast are extreme.

CITATION LIST

Patent Literature

Patent Document 1: Japanese Unexamined Patent Application Publication No. 11-326608
Patent Document 2: Japanese Unexamined Patent Application Publication No. 2008-286878

SUMMARY OF INVENTION

Technical Problem

In the prior-art technologies, too much emphasis is placed on the antiglare properties, the haze value is raised in light of prevention of glare and the image clarity cannot be made sufficiently high, and thus, low light transmittance and whitishness of the coated film are not solved. If an image is displayed, the screen becomes whitish, and particularly image quality is lowered in black display, which is a problem.

An object of the present invention is to provide an antiglare hard coat film for surface protection in which light transmittance is high without giving antiglare properties more than necessary, a haze value is low, transparency is excellent, image clarity is high, glare of an image is suppressed, whitishness (white blur) of the coated film is reduced, contrast deterioration is suppressed, and visibility of the display is improved as compared with the above prior-art antiglare films.

Solution to Problem

After keen examination by the inventors in order to achieve the above object, they have found that the above problems can be solved by an antiglare hard coat film formed by providing an antiglare hard coat layer containing organic particulates and a resin on a transparent film in which when an average value of height in an evaluation region on the surface of the antiglare hard coat film is set to zero (0), a maximum sectional height represented by a difference between a height maximum value in the evaluation region and a height minimum value in the evaluation region is 0.6 μm or less. According to the present invention, since an antiglare hard coat film having a low haze value, high light transmittance and excellent transparency can be obtained, glare of an image can be suppressed, and visibility of the display can be improved.

Also, in the antiglare hard coat film of the present invention, it is preferable that the organic particulates have an average grain size of 2 to 6 μm and the coating film thickness of the antiglare hard coat layer is 1 to 2 times larger than the average grain size of the organic particulates.

Also, in the present invention, the difference in refractive index between the organic particulates and the resin is preferably within a range of 0.001 to 0.020.

Also, in the present invention, it is preferable that a mixed amount of the organic particulates is 3 to 35 weight parts to 100 weight parts of the resin.

Also, in the present invention, it is preferable that the number of organic particulates projecting on the surface of the antiglare hard coat film is 100/mm$^2$ or less.

Also, by setting the haze value of the antiglare hard coat film to 0.1 to 5.0%, 60-degree specular glossiness to 60% or more and 90% or less, 20-degree specular glossiness to 15% or more and 50% or less, and moreover, luminous transmittance (transmission Y value) to 92.00 or more, the advantage of the present invention can be further exerted.

Also, in the antiglare hard coat film of the present invention, by setting the total value of the transmissive clarity measured through four optical combs (having the widths of 2 mm, 1 mm, 0.5 mm, and 0.125 mm) using a transmissive clarity measuring device on the basis of JIS K 7105-1981 at 280% or more and the value of the transmissive clarity measured through each optical comb at 70% or more, respectively, the image clarity is raised, whitishness (white blur) of the coated film is reduced, contrast deterioration is suppressed, and visibility of the display can be improved.

Also, an ionizing radiation curable resin having high general-versatility is preferably used as the resin contained in the antiglare hard coat layer for inexpensive mass production.

Also, as a transparent film used in the present invention, a tri-acetyl cellulose film, a polyethylene terephthalate film or norbornene film or the like is suitably used from the viewpoints of high visibility or a price, for example.

Advantageous Effects of Invention

According to the antiglare hard coat film of the present invention, whitishness of the coated film can be reduced, antiglare properties at a level which poses no problem in practical use, high light transmisttance, high image clarity can be realized without lowering contrast, glare of an image is suppressed, and visibility of the display can be improved.

DESCRIPTION OF EMBODIMENTS

Embodiments of the present invention will be described below in detail.

An antiglare hard coat film of the present invention is an antiglare hard coat film formed by providing an antiglare hard coat layer containing organic particulates and a resin on a transparent film characterized in that when an average value of height in an evaluation region on the surface of the antiglare hard coat film is set to zero (0), a maximum sectional height represented by a difference between a height maximum value in the evaluation region and a height minimum value in the evaluation region is 0.6 μm or less, and according to the antiglare hard coat film, the reason why the haze value is low, the light transmittance is high, and transparency is excellent is presumed as follows according to the examination of the inventors.

The haze value of the antiglare hard coat film includes surface haze generated by refraction and diffusion of light caused by irregularity on the surface of an antiglare hard coat layer and internal haze generated by refraction and diffusion of light caused by presence of organic particulates in the antiglare hard coat layer, and if the maximum sectional height represented by the difference between the height maximum value in the evaluation region and the height minimum value in the evaluation region is 0.6 μm or less when an average value of height in an evaluation region on the surface of the antiglare hard coat film is set to zero (0), since refraction and diffusion of light caused by the irregularity on the surface can be suppressed, the surface haze becomes difficult to appear, and light loss caused by light refraction and diffusion can be suppressed, and thus, it is considered that deterioration in the light transmittance can be suppressed, and at the same time, a phenomenon that the antiglare hard coat film blurs in white by diffused light on the surface of the antiglare hard coat layer is suppressed, and excellent transparency can be obtained.

If the maximum sectional height on the surface of the antiglare hard coat film exceeds 0.6 μm, refraction and diffusion of light caused by the irregularity on the surface are intensified, and thus, the surface haze can easily appear, and a deterioration in the light transmittance caused by light loss due to light refraction and diffusion is concerned, and antiglare properties by diffused light on the surface of the antiglare hard coat layer can be easily obtained. However, since the phenomenon that the antiglare hard coat film is blurred in white cannot be suppressed easily, transparency and transmissive clarity can easily deteriorate.

A lower limit value on the maximum sectional height is not particularly limited, but if the maximum sectional height is less than 0.2 μm, the irregularity on the film surface becomes too small, and the antiglare properties by the diffused light on the surface of the antiglare hard coat layer cannot be obtained easily.

Therefore, in the present invention, the maximum sectional height on the surface of the antiglare hard coat film is preferably 0.2 μm or more and 0.6 μm or less, the maximum sectional height is more preferably 0.25 μm or more and 0.55 μm or less, or the maximum sectional height is further preferably 0.3 μm or more and 0.5 μm or less.

In the present invention, an "evaluation region" refers to a measurement region.

Also, the antiglare hard coat film of the present invention preferably has the number of organic particulates projecting on the surface of the antiglare hard coat film of 100/mm$^2$ or less, and according to the antiglare hard coat film, the reason why the haze value is low, the light transmittance is high, and transparency is excellent is presumed as follows according to the examination of the inventors.

The haze value of the antiglare hard coat film includes surface haze generated by refraction and diffusion of light caused by irregularity on the surface of an antiglare hard coat layer and internal haze generated by refraction and diffusion of light caused by presence of organic particulates in the antiglare hard coat layer, and if the number of organic particulates projecting on the surface of the antiglare hard coat film is 100/mm$^2$ or less, the refraction and diffusion of light caused by irregularity on the surface can be suppressed, the surface haze becomes difficult to appear, and light loss caused by light refraction and diffusion can be suppressed, and thus, it is considered that deterioration in the light transmittance can be suppressed, and at the same time, the phenomenon that the antiglare hard coat film blurs in white by diffused light on the surface of the antiglare hard coat layer is suppressed, and excellent transparency can be obtained.

In the present invention, the number of organic particulates projecting on the surface of the antiglare hard coat film refers to the number of particulates when the area of the organic particulates projecting from a resin layer on the surface in a range of 1 mm×1 mm of the antiglare hard coat film is not less than 0.75 μm$^2$ from a surface photo (image) of the antiglare hard coat film obtained by a scanning electron microscope (2000 power).

The transparent film which can be used in the present invention is not particularly limited but a polyethylene terephthalate film (PET; refractive index of 1.665), a polycarbonate film (PC; refractive index of 1.582), a tri-acetyl cellulose film (TAC; refractive index of 1.485), a norbornene film (NB; refractive index of 1.525) and the like can be used, and the film thickness is also not particularly limited but a film having the thickness of approximately 25 to 250 μm is widely used. Since the refractive index of a general ionizing radiation curable resin is approximately 1.52, a TAC film or an NB film having the refractive index close to the resin is preferable in order to improve visibility, and a PET film is preferable in light of the price.

The resin used in the present invention is not particularly limited as long as it is a resin forming coating, but the ionizing radiation curable resin is preferable from the viewpoint that hardness (pencil hardness, abrasion resistance) is given to the surface of the antiglare hard coat layer and a large amount of heat is not required in formation of the antiglare hard coat layer. Also, the antiglare hard coat layer may contain a leveling agent, an antifoaming agent, a lubricating agent, an ultraviolet ray absorbing agent, a light stabilizer, a polymerization inhibitor, a moist dispersing agent, a rheology control agent, an anti-oxidizing agent, a resisting agent, an antistatic agent, a conductant agent and the like as necessary in a range not changing the advantages of the present invention.

The ionizing radiation curable resin is not particularly limited as long as it is a transparent resin which is curable by irradiation of an electron beam, an ultraviolet ray or the like and can be selected from urethane acrylate resins, polyester acrylate resins, epoxy acrylate resins and the like as appropriate. Preferable ionizing radiation curable resins include UV-curable multi-functional acrylates having two or more (meth)acryloyl groups in a molecule. Specific examples of UV-curable multi-functional acrylates having two or more (meth) acryloyl groups in a molecule include polyol polyacrylate such as neopentyl glycol di(meth)acrylate, 1,6-hexanediol di(meth)acrylate, trimethylol propane tri(meth)acrylate, ditrimethylol propane tetra(meth)acrylate, pentaerythritol tetra(meth)acrylate, pentaerythritol tri(meth)acrylate, di-pentaerythritol hexa (meth)acrylate and the like, epoxy (meth)acrylate such as diacrylate of bisphenol-A diglycidyl ether, diacrylate of neopentyl glycol diglycidyl ether, di(meth)acrylate of 1,6-hexanediol diglycidyl ether, polyester (meth)acrylate which can be obtained by esterizing polyalcohol and polycarboxylic acid and/or anhydride and acrylic acid thereof, urethane (meth)acrylate obtained by reacting polyalcohol, polyisocyanate, and (meth)acrylate containing hydroxyl group, polysiloxane poly(meth)acrylate and the like.

The above-described UV-curable multi-functional acrylates may be used singularly or by mixing two kinds or more, and the content is preferably 50 to 95 weight % to a resin solid portion of coating for the antiglare hard coat layer. In addition to the above multi-functional (meth)acrylates, preferably 10 weight % or less of mono-functional acrylate such as 2-hydroxy (meth)acrylate, 2-hydroxypropyl (meth) acrylate, glycidyl (meth) acrylate and the like may be added to the resin solid portion of the coating for the antiglare hard coat layer.

Also, a polymerizable oligomer used for the purpose of adjusting hardness may be added to the antiglare hard coat layer. Such oligomers include macro monomers such as terminal (meth) acrylate polymethyl (meth) acrylate, terminal styryl poly (meth)acrylate, terminal (meth) acrylate polystyrene, terminal (meth)acrylate polyethylene glycol, terminal (meth)acrylate acrylonitrile-styrene copolymer, terminal (meth)acrylate styrene-methylmethacrylate copolymer and the like, and the content is preferably 5 to 50 weight % to the resin solid portion in the coating for the antiglare hard-coat.

Materials forming the organic particulates used in the present invention are not particularly limited but include vinyl chloride resin (refractive index of 1.53), acrylic resin (refractive index of 1.49), (meth)acrylic resin (refractive index of 1.52 to 1.53), polystyrene resin (refractive index of 1.59), melamine resin (refractive index of 1.57), polyethylene resin, polycarbonate resin, acryl-styrene copolymer resin (refractive index of 1.49 to 1.59) and the like.

Also, in the present invention, the coating film thickness of the antiglare hard coat layer needs to be 1 to 2 times larger than the average grain size of the organic particulates forming the antiglare hard coat layer, and the average grain size of the organic particulates is preferably 2 to 6 μm or more preferably 2.5 to 5.5 μm.

If the coating film thickness is less than 1 time of the average grain size of the organic particulates forming the antiglare hard coat layer, the particulates project on the surface of the coating film, antiglare properties more than necessary are given, which increases diffusion of external light on the surface of the coting film, makes the surface whitish by diffusion of the light and remarkably deteriorates visibility of the display. On the other hand, if the coating film thickness exceeds 2 times larger than the average grain size of the organic particulates forming the antiglare hard coat layer, no antiglare properties can be obtained at all, and light transmittance is lowered. The average grain size of the organic particulates can be measured by laser diffraction-scattering method.

Also, if the average grain size of the organic particulates is less than 2 μm, with the setting of the coating film thickness of the antiglare hard coat layer at 1 to 2 times larger than the average grain size of the organic particulates, no antiglare properties can be obtained at all. On the other hand, if the average grain size of the organic particulates is larger than 6 μm, the coating film thickness needs to be increased, thus light transmittance is lowered.

With regard to the organic particulates used in the present invention, the organic particulates having a difference in the refractive index from the refractive index of the resin forming the antiglare hard coat layer (refractive index after being cured) at 0.001 to 0.020 are preferably used, and the organic particulates having the difference in the refractive index at 0.001 to 0.010 are more preferably used. That is, since the refractive index of the general ionizing radiation curable resin is approximately 1.52, the organic particulates having the refractive index at 1.50 to 1.54 are preferably used. For example, if the resin forming the antiglare hard coat layer is (meth)acrylic resin or urethane acrylate (refractive index=1.52) of the ionizing radiation curable resin, the organic particulates used in the antiglare hard coat layer are preferably (meth) acrylic resin (refractive index of 1.52 to 1.53) or acryl-styrene copolymer resin having the refractive index adjusted to 1.51 to 1.53.

If the difference in the refractive index between the organic particulates forming the antiglare hard coat layer and the resin is less than 0.001, with the setting of the coating film thickness of the antiglare hard coat layer at 1 to 2 times larger than the average grain size of the organic particulates, no antiglare properties are obtained at all. Also, if the difference in the refractive index between the organic particulates forming the antiglare hard coat layer and the resin exceeds 0.020, when the haze value is adjusted so as to become 0.1 to 5.0% so that the light transmittance is not lowered, the number of added parts to the 100 weight parts of the resin is reduced, thus, sufficient antiglare properties cannot be obtained, and with the number of added parts with which the antiglare properties can be obtained, the haze value exceeds 5.0% and the light transmittance and the contrast are deteriorated.

Also, the organic particulates preferably have the refractive index higher than that of the resin used in the antiglare hard coat layer by 0.001 to 0.020. With the particulates having the difference in the refractive index from the resin by 0.001 to 0.020, substantially the same advantages can be obtained, but for the resin forming the antiglare hard coat layer, ionizing radiation curable resin with high versatility such as (meth) acrylic resin, urethane acrylate (refractive index=1.52) is preferably used for inexpensive mass production, and considering availability of the particulates, the particulates having the refractive index higher than that of the resin by 0.001 to 0.020 are preferable. The organic particulates may be used singularly, or two or more kinds may be used at the same time. Even if two or more kinds of the organic particulates are used at the same time, it is preferable that the organic particulates used at the same time have the average grain sizes of 2 to 6 μm and the difference in the refractive index from the resin forming the antiglare hard coat layer is within a range of 0.001 to 0.020. Moreover, inorganic particulates or inorganic particulates or organic particulates having the difference in the refractive index from the resin at less than 0.001 or exceeding 0.020 may be mixed in a range not damaging the advantages of the present invention.

In the present invention, it is preferable that 3 to 35 weight parts of the organic particulates to 100 weight parts of the resin are mixed in the antiglare hard coat layer or more preferably, 5 to 25 weight parts are mixed.

If the mixed amount of the organic particulates is less than 3 weight parts to 100 weight parts of the resin, with the setting of the coating film thickness of the antiglare hard coat layer at 1 to 2 times larger than the average grain size of the organic particulates, no antiglare properties can be obtained at all. If the mixed amount of the organic particulates exceeds 35 weight parts to 100 weight parts of the resin, the haze value is raised, and light transmittance and contrast are deteriorated.

The antiglare hard coat layer can be formed by applying coating obtained by dissolving and dispersing the resin, particulates and the like in a solvent on a transparent film and drying it. The solvent can be selected as appropriate in accordance with solubility of the resin and at least a solid portion (resin, particulates, catalyst, hardening agent, and other additives) can be dissolved or dispersed uniformly. Such solvents include ketones (acetone, methyl ethyl ketone, methyl isobutyl ketone, cyclohexanone and the like), ethers (dioxane, tetrahydrofuran and the like), aliphatic hydrocarbons (hexane and the like), alicyclic hydrocarbons (cyclohexane and the like), aromatic hydrocarbons (toluene, xylene and the like), halogenated carbons (dichloromethane, dichloroethane and the like), esters (methyl acetate, ethyl acetate, butyl acetate and the like), alcohols (methanol, ethanol, isopropanol, butanol, cyclohexanol and the like), cellosolves (methyl cellosolve, ethyl cellosolve and the like), cellosolve acetates, sulfoxides, amides and the like. The solvent may be used singularly or in mixture.

A coating method is not particularly limited, but coating can be performed in a method in which coating film thickness can be easily adjusted such as gravure coating, micro-gravure coating, bar coating, slide-die coating, slot-die coating, dip coating and the like. The film thickness of the antiglare hard coat layer can be measured by observing a photo of an antiglare film section with a microscope or the like and by actually measuring the thickness from the coating film interface to the surface.

Also, in the antiglare film of the present invention, it is preferable that 60-degree specular glossiness is 60% or more and 90% or less and 20-degree specular glossiness is 15% or more and 50% or less, and it is more preferable that luminous transmittance (transmission Y value) is 92.00 or more.

Moreover, in the antiglare film of the present invention, the total value of the transmissive clarity measured through four optical combs (having the widths of 2 mm, 1 mm, 0.5 mm, and 0.125 mm) using a transmissive clarity measuring device on the basis of JIS K 7105-1981 is preferably 280% or more, and the value of the transmissive clarity measured through each optical comb is 70% or more, respectively.

In the antiglare film of the present invention, on the transparent film, a functional layer such as a reflection preventing layer or an antistatic layer may be provided other than the antiglare hard coat layer containing the organic particulates and resin. However, it might be likely that by providing such a functional layer, undulation on the surface is cancelled, and desired antiglare properties cannot be obtained. Thus, if a functional layer is to be provided on the antiglare hard coat layer containing the organic particulates, the film thickness of the functional layer is preferably set to 0.5 μm or less.

Also, a functional layer may be provided below the antiglare hard coat layer. Such functional layers include a refractive index control layer which improves a reflection preventing function, an easy adhesion layer which obtains adhesion between a base material and the antiglare hard coat layer, an antistatic layer and the like.

Also, in the antiglare film of the present invention, if a functional layer such as a reflection preventing layer or an antistatic layer is provided on the antiglare hard coat layer containing the organic particulates other than the antiglare hard coat layer containing the organic particulates and resin on the transparent film, when the coating film thickness of the antiglare hard coat layer is set to the average grain size or less of the organic particulates forming the antiglare hard coat layer, the total coating film thickness of the antiglare hard coat layer and the functional layer needs to be 1 to 2 times larger than the average grain size of the organic particulates forming the antiglare hard coat layer.

In the antiglare film of the present invention, if the functional layer such as a reflection preventing layer or an antistatic layer is provided on the antiglare hard coat layer containing the organic particulates and resin on the transparent film, the maximum sectional height represented by a difference between the height maximum value in the evaluation region and the height minimum value in the evaluation region, when the average value of the height in the evaluation region on the surface of the antiglare film, that is, on the surface of the functional layer is set to zero (0), needs to be 0.6 μm or less.

EXAMPLES

The present invention will be exemplified below by Examples but it is not intended to limit the present invention.

The average grain size of the particulates was measured by a laser diffraction grain measuring device SALD-2200 (by Shimadzu Corporation). The coating film thickness was measured by observing a section with a scanning electron microscope by Keyence Corporation. Unless specifically provided, the "part" and "%" described below refer to "weight part" and "weight %", respectively.

Example 1

Preparation of Coating

Acrylic particulates (by Soken Chemical and Engineering Co., Ltd., average grain size of 5.0 μm, refractive index: 1.525) 1.2 g was added to toluene 55.0 g and sufficiently stirred. An acrylic UV-curable resin (by The Nippon Synthetic Chemical Industry Co., Ltd., refractive index: 1.52) 30.0 g, Irgacure 184 (photopolymerization initiator, by Ciba Specialty Chemicals Co., Ltd) 1.5 g, BYK 325 (leveling agent, by BYK Chemie Co., Ltd.) 0.5 g were added into this solution and sufficiently stirred so as to prepare coating.
<Fabrication of Antiglare Film>
Fuji TAC (tri-acetyl cellulose film by Fuji Film Corporation) was coated with the above coating using a Meyer bar #14 (by RDS) and dried at 80° C. for 1 minute and then, irradiated with ultraviolet rays of 350 mJ/cm² (light source; UV lamp by Fusion Japan) and cured. The thickness of the obtained coating film was 7 μm.

Example 2

Preparation of Coating

The coating was prepared in the same method as in Example 1 except that the acrylic particulates used in Example 1 were changed to acrylic particulates with the refractive index of 1.53 (by Soken Chemical and Engineering Co., Ltd., average grain size of 4.0 μm).
<Fabrication of Antiglare Film>
The antiglare film was fabricated in the same method as in Example 1 except that the Meyer bar used in Example 1 was changed to #10. The thickness of the obtained coating film was 5 μm.

Example 3

Preparation of Coating

Acryl-styrene copolymer particulates (by Sekisui Plastics Co., Ltd., average grain size of 5.0 μm, refractive index: 1.525) 8.7 g was added to toluene 38.5 g and sufficiently stirred. An acrylic UV-curable resin (by The Nippon Synthetic Chemical Industry Co., Ltd., refractive index: 1.52) 25.5 g, Irgacure 184 (photopolymerization initiator, by Ciba Specialty Chemicals Co., Ltd) 1.5 g, BYK 340 (leveling agent, by BYK Chemie Co., Ltd.) 0.5 g were added into this solution and sufficiently stirred so as to prepare coating.
<Fabrication of Antiglare Film>
The antiglare film was fabricated in the same method as in Example 1 except that the Meyer bar used in Example 1 was changed to #18. The thickness of the obtained coating film was 9 μm.

Example 4

Preparation of Coating

The coating was prepared in the same method as in Example 2 except that the acrylic particulates used in Example 2 were changed to acrylic particulates with the average grain size of 2.5 μm (by Soken Chemical and Engineering Co., Ltd., refractive index of 1.53).
<Fabrication of Antiglare Film>
The antiglare film was fabricated in the same method as in Example 2 except that the Meyer bar used in Example 2 was changed to #8. The thickness of the obtained coating film was 3.5 μm.

Example 5

Preparation of Coating

The coating was prepared in the same method as in Example 2 except that the acrylic particulates used in Example 2 were changed to acryl-styrene copolymer particulates with the average grain size of 5.0 μm (by Sekisui Plastics Co., Ltd., refractive index of 1.535).
<Fabrication of Antiglare Film>
The antiglare film was fabricated in the same method as in Example 1. The thickness of the obtained coating film was 7 μm.

Example 6

Preparation of Coating

The coating was prepared in the same method as in Example 2 except that the acrylic particulates used in Example 2 were changed to acryl-styrene copolymer particulates with the average grain size of 5.0 μm (by Sekisui Plastics Co., Ltd., refractive index of 1.505).
<Fabrication of Antiglare Film>
The antiglare film was fabricated in the same method as in Example 1. The thickness of the obtained coating film was 7 μm.

Example 7

Preparation of Coating

Acryl-styrene copolymer particulates (by Sekisui Plastics Co., Ltd., average grain size of 3.0 μm, refractive index: 1.525) 1.5 g was added to toluene 50.0 g and sufficiently stirred. An acrylic UV-curable resin (by The Nippon Synthetic Chemical Industry Co., Ltd., refractive index: 1.52) 45.5 g, Irgacure 184 (photopolymerization initiator, by Ciba Specialty Chemicals Co., Ltd) 3.0 g, BYK 340 (leveling agent, by BYK Chemie Co., Ltd.) 1.0 g were added into this solution and sufficiently stirred so as to prepare coating.
<Fabrication of Antiglare Film>
The antiglare film was fabricated in the same method as in Example 2 except that the Meyer bar used in Example 2 was changed to #8. The thickness of the obtained coating film was 6 μm.

Comparative Example 1

Preparation of Coating

The same coating as that in Example 1 was prepared.
<Fabrication of Antiglare Film>
The antiglare film was fabricated in the same method as in Example 1 except that the Meyer bar used in Example 1 was changed to #6. The thickness of the obtained coating film was 4 μm.

Comparative Example 2

Preparation of Coating

The same coating as that in Example 5 was prepared.
<Fabrication of Antiglare Film>
The antiglare film was fabricated in the same method as in Example 1 except that the Meyer bar used in Example 5 was changed to #36. The thickness of the obtained coating film was 20 μm.

Comparative Example 3

Preparation of Coating

Acrylic particulates (by Soken Chemical and Engineering Co., Ltd., average grain size of 5.0 μm, refractive index: 1.525) 12.5 g was added to toluene 28.0 g and sufficiently stirred. An acrylic UV-curable resin (by The Nippon Synthetic Chemical Industry Co., Ltd., refractive index: 1.52) 22.0 g, Irgacure 184 (photopolymerization initiator, by Ciba Specialty Chemicals Co., Ltd) 1.5 g, BYK 375 (leveling agent, by BYK Chemie Co., Ltd.) 0.5 g were added into this solution and sufficiently stirred so as to prepare coating.
<Fabrication of Antiglare Film>
The antiglare film was fabricated in the same method as in Example 1 except that the Meyer bar used in Example 1 was changed to #18. The thickness of the obtained coating film was 9 μm.

Comparative Example 4

Preparation of Coating

An acrylic UV-curable resin (by The Nippon Synthetic Chemical Industry Co., Ltd., refractive index: 1.52) 33.0 g, Irgacure 184 (photopolymerization initiator, by Ciba Specialty Chemicals Co., Ltd) 1.5 g, BYK 325 (leveling agent, by BYK Chemie Co., Ltd.) 0.5 g were added into toluene 60.0 g and sufficiently stirred so as to prepare coating.
<Fabrication of Antiglare Film>
The antiglare film was fabricated in the same method as in Example 1. The thickness of the obtained coating film was 7 μm.

Comparative Example 5

Preparation of Coating

Acryl-styrene copolymer particulates (by Sekisui Plastics Co., Ltd., average grain size of 8.0 μm, refractive index: 1.525) 8.7 g was added to toluene 38.5 g and sufficiently stirred. An acrylic UV-curable resin (by The Nippon Synthetic Chemical Industry Co., Ltd., refractive index: 1.52) 25.5 g, Irgacure 184 (photopolymerization initiator, by Ciba Specialty Chemicals Co., Ltd) 1.5 g, BYK 340 (leveling agent, by BYK Chemie Co., Ltd.) 0.5 g were added into this solution and sufficiently stirred so as to prepare coating.
<Fabrication of Antiglare Film>
The antiglare film was fabricated in the same method as in Example 1 except that the Meyer bar used in Example 1 was changed to #18. The thickness of the obtained coating film was 9 μm.

Each antiglare hard coat film of Examples and Comparative Examples fabricated as above was evaluated for the following items and the result is shown in Table 1.

(1) Maximum Sectional Height

The maximum sectional height was measured by using a three-dimensional surface roughness meter, "VertScan2.0" by Ryoka Systems Inc. The maximum sectional height (St) was acquired from a difference between the height maximum value (P) in the evaluation region and the height minimum value (V) in the evaluation region when the average value (Ave) of the height in the evaluation region of a region roughness parameter obtained by the measurement is zero. The measurement conditions were set as follows:
<Optical Conditions>
Camera: SONY HR-50 1/3 model
Objective: 10×(10 power)
Tube: 1×Body
Relay: No relay
Filter: 530 white
Note: Automatically performed so that the value of the lamp falls within the range of 50 to 95.
<Measurement Conditions>
Mode: Wave
Size: 640×480
Range (μm): Start(5), Stop(−10)

(2) Number of projecting particulates (organic particulates)

From the surface photo (image) of the antiglare hard coat film obtained by the scanning electron microscope by Keyence Corporation (2000 power), the number of particulates when the area of the organic particulates projecting from a resin layer on the surface in a range of 1 mm×1 mm of the antiglare hard coat film is not less than 0.75 μm$^2$ was calculated. With the scanning electron microscope (2000 power), if the area is not less than approximately 0.03 μm$^2$, the projecting organic particulates can be recognized from the surface photo (image) of the antiglare hard coat film.

(3) Haze Value

The haze value was measured by using a haze meter "HM150" by Murakami Color Research Laboratory Co., Ltd.

(4) Luminous Transmittance (Transmission Y Value)

Measurement was made by using "Fast Spectrophotometric Transmittance meter DOT-3" by Murakami Color Research Laboratory Co., Ltd. with a method in compliance with JISZ8722

The luminous transmittance here can be acquired from $Y=K\int s(\lambda)y(\lambda)T(\lambda)d\lambda$. $S(\lambda)$: spectral distribution of the wavelength 400 to 700 nm, $y(\lambda)$: color-matching function, $T(\lambda)$: spectral solid-angle transmittance, and Y: luminous transmittance.

(5) Transmissive Clarity

Measurement was made by using an image clarity meter, "ICM-1DP" by Suga Test Instruments Co., Ltd. The measurement was made by using optical combs having the widths of 2 mm, 1 mm, 0.5 mm, and 0.125 mm, and the measurement value in each width and the total were calculated.

(6) Glossiness (20-Degree, 60-Degree)

A black plastic tape (Nitto plastic tape, PROSELF No. 21 (wide)) is attached on the surface opposite to the coating by using a gloss meter (GM-3D) by Murakami Color Research Laboratory Co., Ltd. and 20-degree and 60-degree glossiness was measured.

(7) Glare

Each of the antiglare film was overlapped on a liquid-crystal display body (LCD) having resolution of 150 ppi in green on the whole surface, and a degree of occurrence of glare on the screen was visually evaluated. A clear type hard coat film on which glare is not generated was installed in advance on the LCD surface. Those with no or little glare were evaluated as "Good", and those with large glare and deteriorated visibility as "Poor". Moreover, those evaluated to be glare between "Good" and "Poor" were given "Fair".

(8) White Blur, Whitishness

The white blur caused by reflection of external light was measured as black density by Macbeth densitometer by attaching a black plastic tape (Nitto plastic tape, PROSELF No. 21 (wide)) on the surface opposite to the coating. The value not less than 2.15 was evaluated as "Good", the value at 2.10 or more and less than 2.15 as "Fair", and the value less than 2.10 as "Poor". Also, as for the whitishness of the coating film by transmitted light, a state in which light is diffused in the film by internal haze and the coating film becomes whitish when the coated surface is located on the observer side and a white fluorescent lamp is seen through the antiglare hard coat film was visually evaluated. Those with no or little whitishness were evaluated as "Good", those with slightly strong whitishness as "Fair", and whitish coating film as "Poor".

white blur and whitishness could not be obtained. In Comparative Example 1 having a small coating film thickness, the haze was raised, and with that, the image clarity, lowered glossiness, glare, white blur and whitishness were markedly deteriorated. Comparative Example 2 with a large coating film thickness has a relatively favorable result, but whitishness was somewhat strong. In Comparative Example 3 with the large number of added particulates, since the particulates project from the coating film, high antiglare properties appeared and lowered image clarity, and glare, white blur, and whitishness became strong. Moreover, in Comparative Example 4 in which no particulates were added, glossiness was high and no antiglare properties were obtained at all. In Comparative Example 5 in which the organic particulates are contained, and the maximum sectional height in the evaluation region on the surface of the antiglare hard coat film is larger than 0.6 μm, but the number of organic particulates

TABLE 1

| | Maximum sectional height (μm) | Number of projecting particulates (pieces/mm$^2$) | Haze (%) | Luminous transmittance (transmission Y value) | Transmissive clarity (%) Optical comb width (mm) | | | | | Glossiness | | White | Whitishness |
|---|---|---|---|---|---|---|---|---|---|---|---|---|---|
| | | | | | 0.125 | 0.5 | 1.0 | 2.0 | Total | 20° (%) | 60° (%) | Glare blur | |
| Example 1 | 0.48 | 0 | 0.6 | 92.05 | 85 | 85 | 88 | 91 | 349 | 25 | 80 | Good Good | Good |
| Example 2 | 0.59 | 10 | 2.5 | 92.02 | 92 | 92 | 93 | 94 | 371 | 31 | 78 | Good Good | Good |
| Example 3 | 0.59 | 30 | 2.4 | 92.09 | 73 | 77 | 80 | 83 | 313 | 18 | 75 | Good Good | Good |
| Example 4 | 0.39 | 25 | 1.8 | 92.10 | 94 | 94 | 96 | 97 | 381 | 45 | 88 | Good Good | Good |
| Example 5 | 0.42 | 15 | 3.4 | 92.09 | 71 | 75 | 78 | 81 | 311 | 20 | 72 | Good Good | Fair |
| Example 6 | 0.52 | 15 | 3.8 | 92.10 | 72 | 76 | 79 | 82 | 312 | 19 | 73 | Good Good | Fair |
| Example 7 | 0.23 | 0 | 1.1 | 92.01 | 96 | 96 | 97 | 97 | 386 | 25 | 88 | Good Good | Good |
| Comparative Example 1 | 2.50 | 10000 | 48.5 | 92.20 | 1 | 5 | 10 | 15 | 31 | 1 | 10 | Poor Poor | Poor |
| Comparative Example 2 | 1.20 | 120 | 13.5 | 92.09 | 70 | 74 | 77 | 80 | 301 | 40 | 82 | Good Fair | Fair |
| Comparative Example 3 | 1.50 | 100000 | 33.7 | 92.24 | 4 | 4 | 9 | 15 | 32 | 5 | 16 | Poor Poor | Poor |
| Comparative Example 4 | 0.05 | 0 | 0.2 | 92.10 | 97 | 97 | 97 | 97 | 388 | 98 | 98 | Good Good | Good |
| Comparative Example 5 | 1.00 | 75 | 2.7 | 92.10 | 65 | 66 | 70 | 80 | 281 | 15 | 70 | Fair Fair | Fair |

As obvious from the result in Table 1, each of Examples 1 to 7 having the maximum sectional height in the evaluation region on the surface of the antiglare hard coat film at 0.6 μm or less has favorable luminous transmittance, image clarity, and glossiness, and the antiglare hard coat film with suppressed glare, white blur and whitishness was obtained.

Also, for all of Examples 1 to 7, the number of organic particulates projecting on the surface of the antiglare hard coat film was 100/mm$^2$ or less, and the average grain size of the particulates, the refractive index difference from the resin, and the mixed amount thereof used in the antiglare hard coat layer, the coating film thickness of the antiglare hard coat layer, and the haze value of the antiglare hard coat film are within the respective desired ranges of the present invention, and the antiglare hard coat film having favorable luminous transmittance, image clarity, and glossiness and suppressed glare, white blur, and whitishness was obtained.

On the other hand, with any of Comparative Examples 1 to 3 in which though the organic particulates are contained, the maximum sectional height in the evaluation region on the surface of the antiglare hard coat film is larger than 0.6 μm and moreover, the number of organic particulates projecting on the surface of the antiglare hard coat film exceeds 100/mm$^2$, an antiglare hard coat film having favorable luminous transmittance, image clarity, and glossiness and suppressed glare, projecting on the surface of the antiglare hard coat film is not more than 100/mm$^2$, probably because the grain size of the used particulates was large and the coating film thickness was substantially the same as the grain size of the particulates, though the number of organic particulates projecting on the surface is not more than 100/mm$^2$, the coating film surface became rough, and glare, white blur, and whitishness were all deteriorated.

The invention claimed is:

1. An antiglare hard coat film for surface protection in which light transmittance is high, a haze value is low, image clarity is high, glare is suppressed and white blur is reduced, the antiglare hard film coat comprising:
an antiglare hard coat layer containing organic particulates and a resin on a transparent film, wherein
when an average value of height in an evaluation region on the surface of the antiglare hard coat film is set to zero (0), a maximum sectional height represented by a difference between a height maximum value in the evaluation region and a height minimum value in the evaluation region is 0.6 μm or less,
wherein
a number of said organic particulates projecting on the surface of said antiglare hard coat film is 100/mm$^2$ or less, and wherein
a haze value of said antiglare hard coat film is 0.1 to 5.0%, 60-degree specular glossiness is 60% or more and 90% or less, 20-degree specular glossiness is 15% or more and 50% or less, and luminous transmittance (transmission Y value) is 92.00 or more.

2. The antiglare hard coat film according to claim 1, wherein
said organic particulates have an average grain size of 2 to 6 μm and the coating film thickness of said antiglare hard coat layer is 1 to 2 times larger than the average grain size of said organic particulates.

3. The antiglare hard coat film according to claim 1, wherein
a difference in refractive index between said organic particulates and said resin is 0.001 to 0.020.

4. The antiglare hard coat film according to claim 1, wherein
a mixed amount of said organic particulates is 3 to 35 weight parts to 100 weight parts of said resin.

5. The antiglare hard coat film according to claim 1, wherein
the total value of transmissive clarity measured through four optical combs (having the widths of 2 mm, 1 mm, 0.5 mm, and 0.125 mm) using a transmissive clarity measuring device on the basis of JIS K 7105-1981 is 280% or more and the value of the transmissive clarity measured through each optical comb is 70% or more, respectively.

6. The antiglare hard coat film according to claim 1, wherein said resin contained in said antiglare hard coat layer is an ionizing radiation curable resin.

7. The antiglare hard coat film according to claim 1, wherein
said transparent film is a tri-acetyl cellulose film, a polyethylene terephthalate film or norbornene film.

8. The antiglare hard coat film according to claim 2, wherein
a difference in refractive index between said organic particulates and said resin is 0.001 to 0.020.

9. The antiglare hard coat film according to claim 2, wherein
a mixed amount of said organic particulates is 3 to 35 weight parts to 100 weight parts of said resin.

10. The antiglare hard coat film according to claim 2, wherein
the total value of transmissive clarity measured through four optical combs (having the widths of 2 mm, 1 mm, 0.5 mm, and 0.125 mm) using a transmissive clarity measuring device on the basis of JIS K 7105-1981 is 280% or more and the value of the transmissive clarity measured through each optical comb is 70% or more, respectively.

11. The antiglare hard coat film according to claim 2, wherein
said resin contained in said antiglare hard coat layer is an ionizing radiation curable resin.

12. The antiglare hard coat film according to claim 2, wherein
said transparent film is a tri-acetyl cellulose film, a polyethylene terephthalate film or norbornene film.

* * * * *